(12) United States Patent
Sazarin

(10) Patent No.: US 11,114,731 B2
(45) Date of Patent: Sep. 7, 2021

(54) BATTERY MODULE

(71) Applicant: SAFT, Levallois-Perret (FR)

(72) Inventor: Rémi Sazarin, Latille (FR)

(73) Assignee: SAFT, Levallois-Perret (FR)

( * ) Notice: Subject to any disclaimer, the term of this patent is extended or adjusted under 35 U.S.C. 154(b) by 219 days.

(21) Appl. No.: 16/314,950

(22) PCT Filed: Jun. 30, 2017

(86) PCT No.: PCT/EP2017/066293
§ 371 (c)(1),
(2) Date: Jan. 3, 2019

(87) PCT Pub. No.: WO2018/007255
PCT Pub. Date: Jan. 11, 2018

(65) Prior Publication Data
US 2019/0207198 A1    Jul. 4, 2019

(30) Foreign Application Priority Data

Jul. 4, 2016 (FR) .................................. 1656362

(51) Int. Cl.
*H01M 50/597* (2021.01)
*H01M 10/04* (2006.01)
(Continued)

(52) U.S. Cl.
CPC ..... *H01M 50/597* (2021.01); *H01M 10/0445* (2013.01); *H01M 10/643* (2015.04);
(Continued)

(58) Field of Classification Search
CPC ....... H01M 2/02; H01M 2/0237–0247; H01M 2/043–0439; H01M 2/0456–046;
(Continued)

(56) References Cited

U.S. PATENT DOCUMENTS 4,644,244 A * 2/1987 Kittelson ............... H01M 10/46
320/100
5,445,900 A * 8/1995 Miller, Jr. ........... H01M 2/1055
429/1

(Continued)

FOREIGN PATENT DOCUMENTS

DE    10 2008 034699 A1    1/2010
DE    10 2011 081573 A1    2/2013

OTHER PUBLICATIONS

Machine translation of Schweiger et al. (DE 10 2011 081573). Originally available Feb. 28, 2013. (Year: 2013).*

(Continued)

*Primary Examiner* — Jonathan Crepeau
*Assistant Examiner* — Jacob Buchanan
(74) *Attorney, Agent, or Firm* — Sughrue Mion, PLLC

(57) ABSTRACT

A battery module having a housing (15) including a plurality of cavities (16), each receiving a housing-element assembly (1) having: a) an electrochemical element (2) with a cylindrical container and two current output terminals (3, 4) disposed on a wall of one of the ends of the container, at least one of the two current output terminals being electrically connected to an electrical connection bar (5); b) a housing (6) in the form of a tube for receiving the electrochemical element, the housing electrically insulating the electrochemical element and having one or more indexing members (7, 8); c) a housing cover (9) provided with a means (10) for causing the electrochemical element to rotate about its longitudinal axis.

22 Claims, 6 Drawing Sheets

(51) Int. Cl.
*H01M 10/643* (2014.01)
*H01M 10/658* (2014.01)
*H01M 50/10* (2021.01)
*H01M 50/20* (2021.01)
*H01M 50/147* (2021.01)
*H01M 50/166* (2021.01)
*H01M 50/502* (2021.01)

(52) U.S. Cl.
CPC ......... *H01M 10/658* (2015.04); *H01M 50/10* (2021.01); *H01M 50/147* (2021.01); *H01M 50/166* (2021.01); *H01M 50/20* (2021.01); *H01M 50/502* (2021.01)

(58) Field of Classification Search
CPC ..... H01M 2/10–1094; H01M 2/20–28; H01M 10/04; H01M 10/0422; H01M 10/044563; H01M 10/64–643; H01M 50/10–102; H01M 50/117; H01M 50/131; H01M 50/147–152; H01M 50/155–159; H01M 50/166; H01M 50/172–174; H01M 50/179; H01M 50/20–207; H01M 50/213; H01M 50/218–224; H01M 50/233–242; H01M 50/244; H01M 50/249; H01M 50/251–262; H01M 50/269–278; H01M 50/284–298; H01M 50/50–514; H01M 50/517–521
See application file for complete search history.

(56) References Cited

U.S. PATENT DOCUMENTS

| | | | | |
|---|---|---|---|---|
| 6,528,206 | B2* | 3/2003 | Ruiz Rodriguez | H01M 2/1072 |
| | | | | 429/204 |
| 2006/0255764 | A1* | 11/2006 | Cho | H01M 2/1077 |
| | | | | 320/116 |
| 2006/0267548 | A1* | 11/2006 | Uehlein-Proctor | B25F 5/02 |
| | | | | 320/107 |
| 2007/0003825 | A1* | 1/2007 | Touchton | H01M 2/105 |
| | | | | 429/97 |
| 2008/0182168 | A1* | 7/2008 | Byun | H01M 2/202 |
| | | | | 429/158 |
| 2009/0111015 | A1* | 4/2009 | Wood | H01M 2/202 |
| | | | | 429/164 |
| 2009/0208836 | A1 | 8/2009 | Fuhr et al. | |
| 2009/0268385 | A1* | 10/2009 | Harbin | G06F 1/26 |
| | | | | 361/679.02 |
| 2011/0135975 | A1* | 6/2011 | Fuhr | H01M 2/08 |
| | | | | 429/53 |
| 2013/0288097 | A1* | 10/2013 | Kawatani | B62J 43/16 |
| | | | | 429/100 |
| 2015/0221914 | A1* | 8/2015 | Page | H01M 2/1016 |
| | | | | 429/82 |

OTHER PUBLICATIONS

International Search Report of PCT/EP2017/066293 dated Aug. 11, 2017 [PCT/ISA/210], English Translation.

* cited by examiner

BATTERY MODULE

CROSS REFERENCE TO RELATED APPLICATIONS

This application is a National Stage of International Application No. PCT/EP2017/066293, filed Jun. 30, 2017, claiming priority based on French Patent Application No. 1656362, filed Jul. 4, 2016.

TECHNICAL FIELD

The present invention relates to the technical field of battery modules.

PRIOR ART

A battery module, also designated equivalently in what follows by the term "module", is known to the prior art. Document EP 1 109 237, for example, may be cited, which describes several electrochemical cells, also called cells, electrically connected with each other, in series or in parallel, by means of metal bars. The assembly of these bars, commonly referred to by the term "busbar", is used for the circulation of high intensity currents. A first plate including a plurality of cavities receives one of the ends of the cells. A second plate also including a plurality of cavities receives the opposite end of the cells. The cavities are hollowed out on each plate at predetermined locations, thereby holding the cells in a predetermined spacing. The assembly formed by the plurality of cells and the two plates is placed in a casing. A battery module is thus formed.

Document CN 204651366 U also describes a battery module. Multiple cylindrical cells are aligned next to one another. A metal bar having a "sawtooth" shape is used to electrically connect multiple cells with each other. As in the previous document, a first and a second plate, each having a plurality of cavities are used for holding the cells in a predetermined spacing.

It may happen that one of the cells of the module is faulty and that it is necessary to replace it. However, in the set-ups described above, the withdrawal of one of the cells is complex since it requires dismantling the top plate and multiple connecting metal bars. This complexity is accentuated in the case of cells of the lithium-ion type, since these are generally provided with electronic components.

A module is therefore sought that makes it possible to individually withdraw a cell from the battery module. It is also sought to simplify the maintenance operations of a module.

In addition, in the event of overheating of one of the cells, the modules previously described do not allow the cell undergoing overheating to be thermally insulated from the neighboring cells. A module is therefore sought wherein the rise in temperature of one of the cells does not spread to the neighboring cells.

SUMMARY OF THE INVENTION

For this purpose, the invention provides a housing-cell assembly comprising:

a) an electrochemical cell comprising a cylindrical container and two current output terminals arranged on a wall of one of the ends of the container, at least one of the two current output terminals being electrically connected to an electrical connection bar;

b) a housing having the form of a tube wherein the electrochemical cell is housed, the housing electrically insulating the electrochemical cell and having one or more foolproof positioning devices;

c) a housing cover provided with a means for causing the electrochemical cell to rotate about its longitudinal axis.

According to one embodiment, a thermal insulation material is arranged around the container of the electrochemical cell.

According to one embodiment, the foolproof positioning device consists of one or more lugs, preferably two lugs located on the circumference of the housing.

According to one embodiment, the foolproof positioning device consists of a flange having one or more hollows.

According to one embodiment, the housing cover comprises two orifices for the passage of the current output terminals.

According to one embodiment, one of the ends of the container of the cell is closed by a cover and the electrical connection bar or bars are attached directly onto the cover of the cell.

According to one embodiment, the electrical connection bar is flat.

According to one embodiment, the profile of the electrical connection bar is bent, forming, for example, an angle of about 90°, the bend delimiting two parts, a first part flat and electrically connected to a current output terminal, a second forming an arc of a circle.

According to one embodiment, the container has one end closed by a wall having a thinning suitable for bursting under overpressure inside the container.

According to one embodiment, the electrochemical cell is of the lithium-ion type.

The object of the invention is also a battery module including a casing including a plurality of cavities, each receiving a housing-cell assembly as described above.

According to one embodiment, each cavity has a wall comprising one or more grooves into which a foolproof positioning device of the housing is inserted.

According to one embodiment, the casing has a face for inserting the housing-cell assemblies, said insertion face including a support on which electrically conductive tracks are arranged, each electrical connection bar being in contact with an electrically conductive track.

According to one embodiment, the profile of an electrical connection bar forms an angle of about 90° thus delimiting two parts, a first part being flat and electrically connected to a current output terminal of the electrochemical cell, a second part in the shape of an arc of a circle and held in contact with an electrically conductive track. The second part of the electrical connection bar forming an arc of a circle may be in contact with a portion of the electrically conductive track, said portion in the shape of an arc of a circle extending in a direction forming an angle of 90° with the support. The contact between the second part of the electrical connection bar forming an arc of a circle and the portion of the electrically conductive track may be provided by a mechanical device, such as a clamp.

According to one embodiment, the module further includes an elastic device placed between a housing-cell assembly and a wall of the casing, said elastic device holding the electrical connection bar or bars in contact with one or more electrically conductive tracks.

According to one embodiment, the face opposite the face for inserting the housing-cell assemblies includes an openwork wall, e.g. a grid.

Finally, the object of the invention is also a method of manufacturing a battery module, said method comprising the steps of:

a) providing a casing including a plurality of cavities, each cavity being intended to receive a housing-cell assembly, said casing having a face for inserting the housing-cell assemblies, said insertion face including a support on which electrically conductive tracks are arranged;

b) inserting a housing-cell assembly into a cavity;

c) rotating the housing-cell assembly about the longitudinal axis of the cell for placing the electrical connection bar or bars in contact with one or more electrically conductive tracks, the foolproof positioning device of the housing serving as a stop to the rotation of the housing-cell assembly;

d) attaching the electrical connection bar or bars onto the electrically conductive track or tracks;

e) repeating steps b) to d).

The method may also include a step f) of attaching a front face onto the casing, said front face including:

one or more means facilitating the gripping of the module, such as one or more rods arranged in one or more hollow portions of the front face and attached to the thickness of the front face, two positive and negative current output terminals of the battery module;

one or more connector pins allowing the measurement of parameters related to the operation of the module.

DETAILED DESCRIPTION OF EMBODIMENTS

Figure 1:
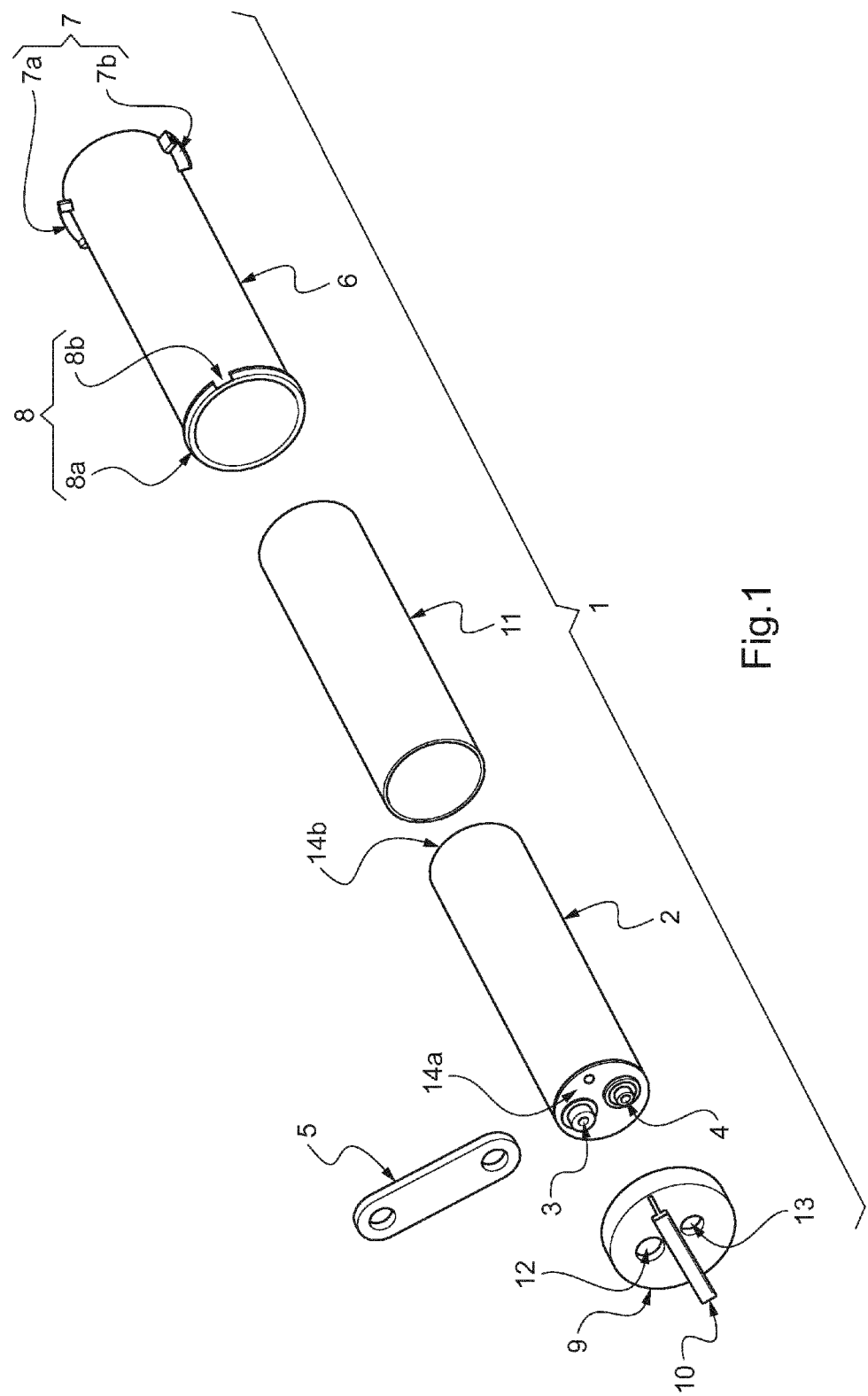
FIG. 1 is an exploded view of a housing-cell assembly.

The housing-cell assembly is described in what follows with reference to FIG. 1. The housing-cell assembly (1) includes an electrochemical cell (2) comprising a cylindrical container. The container has a side wall and two ends closed off. One of the ends is closed off by a cover (14*a*) while the other closed end forms the back of the container (14*b*). Two current output terminals (3, 4) are arranged on one of the ends of the container. It may be the cover or the back of the container. Generally, the two current output terminals are located on the cover of the cell. At least one of the two current output terminals is electrically connected to a connection bar (5). The connection bar is generally in the form of a metal plate, generally made of copper, or nickel-plated copper. The shape of the connecting bar is not limited to a flat plate. As will be explained below, the connection bar may have a profile forming a bend, e.g. a bend forming an angle of about 90°.

The side wall of the container is electrically insulated from the casing described below thanks to a tube (6) consisting of or including an electrical insulating material. This tube covers the side wall of the cell. Preferably, the tube includes or consists of a material belonging to flammability class V0. The tube is open at both its ends. Its length is substantially equal to that of the cell. The first end of the tube is located on the cover side of the cell. The second end of the tube is located on the back side of the container. Preferably, the external surface of the tube is cylindrical.

Preferably, in order to thermally insulate the cell, a sleeve (11) consisting of a thermal insulation material is inserted between the cell (2) and the tube (6). This sleeve may consist of a laminated, fiber-filled plastic, such as a cotton fabric reinforced phenolic resin, or a glass fiber reinforced epoxy resin. When the cell undergoes a rise in temperature, this sleeve helps prevent the propagation of heat to the neighboring battery components of this cell.

The tube (6) has a foolproof positioning system on its circumference, generally in the vicinity of each of its ends. The first foolproof positioning system (7) is located on the end of the tube on the back side of the cell container. It may be in the form of two lugs (7*a*, 7*b*), preferably located on one of the diameters of the tube. The function of this foolproof positioning device is to force the insertion of the housing-cell assembly into a predetermined orientation.

The second foolproof positioning system (8) is located on the end of the tube on the cover side of the cell. It may be in the form of a flange (8*a*) comprising a hollow portion (8*b*).

The cover (9) of the housing is attached to one of the ends of the tube (6). It is generally disk-shaped and comprises two sockets (12, 13) intended to receive the current output terminals (3, 4) of the cell. These sockets may be openings made in the thickness of the cover. A handle (10) is used to cause the electrochemical cell (2) to rotate about its longitudinal axis. The rotational movement of the housing cover is transmitted on the one hand to the electrochemical cell due to the fact that the current output terminals (3, 4) of the cell are rigidly connected to the housing cover. The rotational movement of the housing cover is also transmitted to the tube (6) due to the mechanical link between a foolproof positioning device located on the housing cover and the foolproof positioning device (8) located on the tube (6). The hollow portion (8*b*) located on the tube is intended to receive the foolproof positioning device placed on the housing cover (9).

At least one of the two current output terminals (3, 4) is electrically connected by screwing or by soldering to a connection bar (5). In the case of a series connection of cells, the cells located at the two ends of the series circuit will generally have only one of their two current output terminals connected to a connection bar. One of the ends of the bar is electrically connected to a current output terminal by screwing or soldering. The other end is electrically connected to an electrically conductive track of the power circuit. In order to facilitate the withdrawal of the housing-cell assembly from the casing, the end of the bar is connected to the electrically conductive track of the power circuit by means of a screw-nut system.

The steps of fitting the housing-cell assembly are as follows:

a) a cylindrical cell (2) is provided;

b) optionally, it is covered with a sleeve (11) consisting of a thermal insulation material;

c) the cell is inserted, optionally provided with the sleeve, into the tube (6);

d) the cover (9) of the housing is placed on the tube ensuring that the sockets of the cover receive the output current terminals of the cell;

e) a connection bar (5) is attached onto one or onto both positive (3) and negative (4) current output terminals of the cell.

Figure 2:
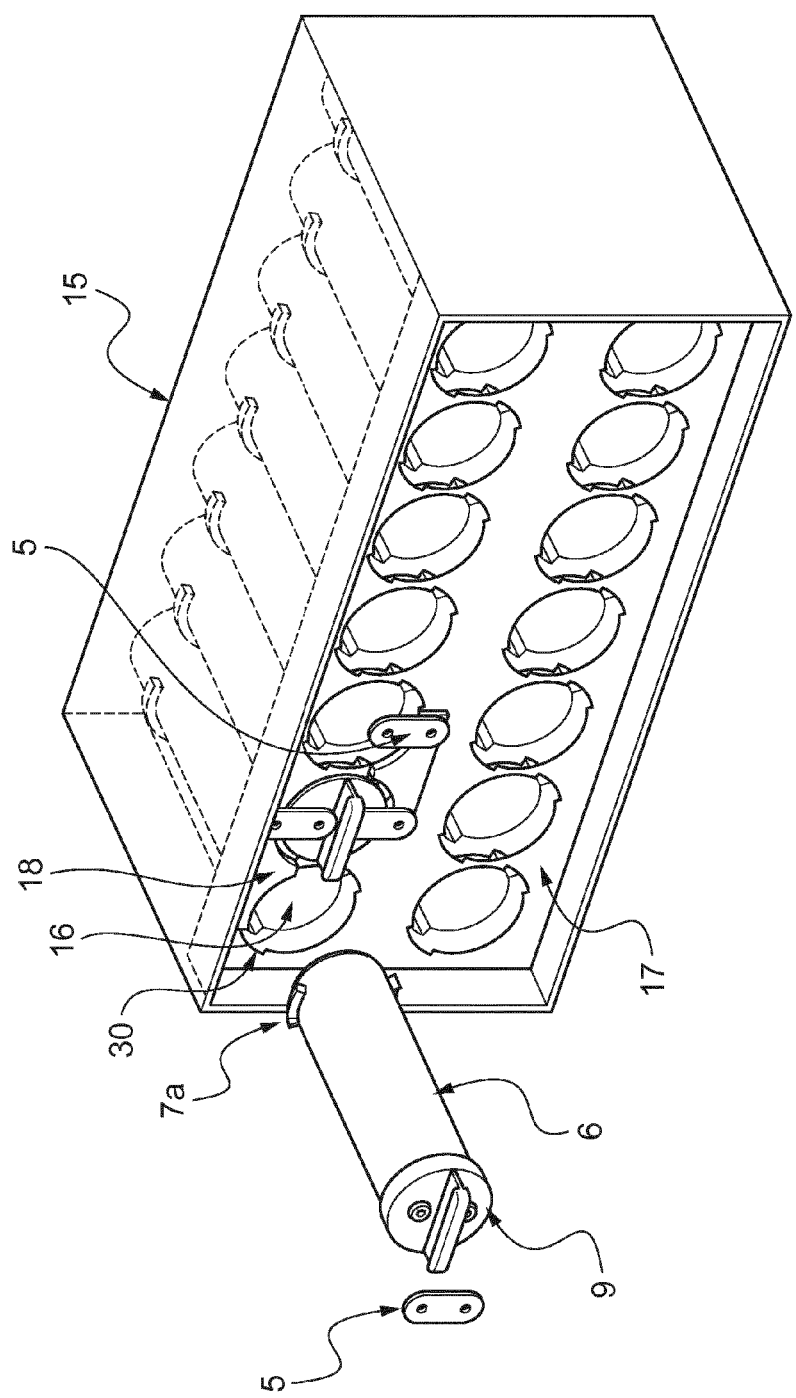
FIG. 2 represents a schematic view of the casing. The face for inserting the housing-cell assemblies lies in the foreground of the figure.

The casing will now be described with reference to FIG. 2. The casing (15) is generally parallelepiped in shape and includes a plurality of compartments (16) which are cylindrical cavities each intended to receive an electrochemical cell. The cavities may be distributed in multiple rows. The number of cavities per row depends on the intended electrical application. For example, in FIG. 2, the compartments are distributed in two rows, each row including seven cavities. This configuration is suitable for connecting seven cells in series and constituting two parallel branches each formed of seven cells in series. It is understood that the invention is not confined to the configuration represented in FIG. 2 and that the number of cells per row and the number of rows may be modified according to the energy needs of the intended electrical application. The wall of each cavity has one or more grooves (30), the shape of which complements the shape of the foolproof positioning device (7a) located on one of the ends of the tube (6) of the housing-cell assembly.

The casing has a face for inserting the cells. This face for inserting the cells includes a support (17) on which electrically conductive tracks (18) are arranged suitable for the circulation of high intensity currents. These tracks constitute the "power circuit" and are intended to be connected to the connection bars (5). The support may also include an electronic monitoring and management circuit for the cells (not represented) for monitoring their charge state and/or their state of health, notably by means of individual voltage or current measurements or on the scale of a group of cells.

The support may include a first layer consisting of a metal base serving as a power circuit and a second layer consisting of an electronic printed circuit. These two layers are described in document EP 2 224 515.

The support may also be as described in document EP 2 518 818. Such a support allows the heat loss of the electronic components of the battery monitoring electronic circuit to be used for heating the cells.

The material of the casing is generally plastic, and preferably belongs to flammability class V0. The spaces between the compartments are generally also filled with a material belonging to flammability class V0.

Figure 3:
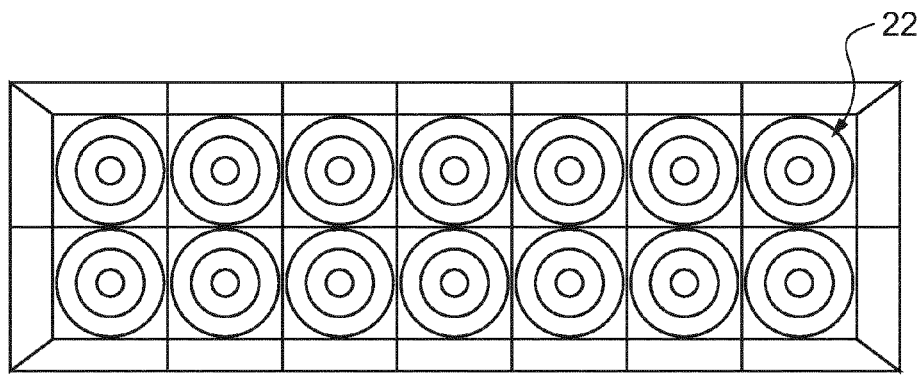
FIG. 3 represents a schematic view of an openwork wall located on the rear face of the casing.

According to a preferred embodiment, the face of the casing opposite the face for inserting the cells includes an openwork wall, and one or more cells are provided with a device for opening the cell container in the event of overpressure inside the container. Such a device is described in document EP 1 626 456. This device takes the form of a thinning that bursts under the effect of an overpressure inside the container. The combination of a device for evacuating gases outside the cell container with the openwork wall of the casing allows the evacuation of gases outside the module. A diagram of the openwork wall of the casing is represented in FIG. 3. The openwork wall has at its periphery a solid rectangular frame, which is attached to the casing e.g. by screwing, and an openwork part (22) in the form of a grid subdivided into two rows, each row including an alignment of seven openwork portions. Each openwork portion is arranged facing the wall of the cell container including the device for opening up the cell container in the event of overpressure inside the container. The use of an openwork wall makes it possible, in the event of opening the container of one of the cells, to quickly identify the faulty cell and replace it. In addition, the openwork wall prevents the ejection of the electrochemical bundle outside the cell container in the event of its being opened.

This is advantageous in comparison with a casing of the prior art wherein the wall forming the back of the casing is often an opaque wall. The identification of a faulty cell in such a casing generally requires cutting the wall, an operation which is difficult to perform and which may prove dangerous to the operator.

Figure 4:
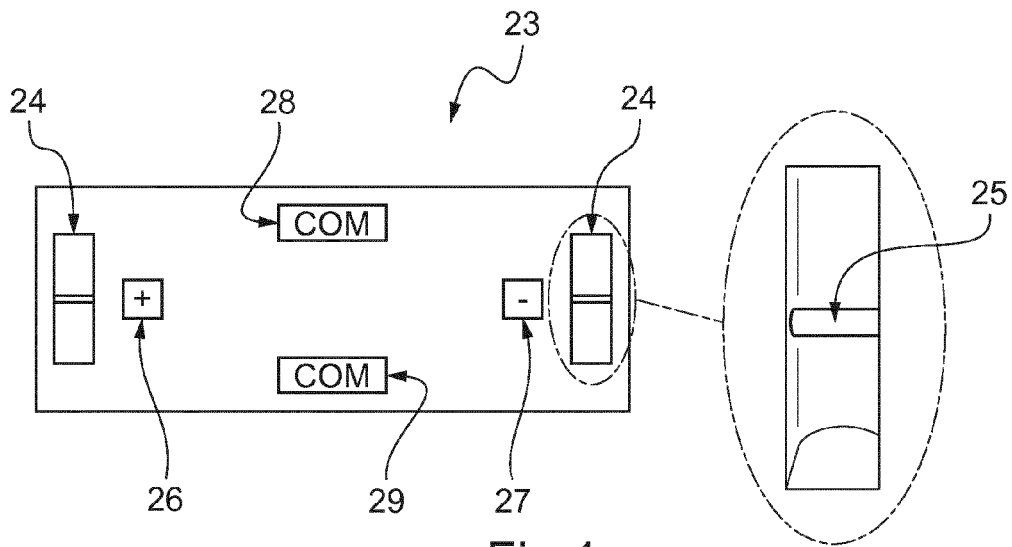
FIG. 4 represents a schematic view of the front face of the casing.

The casing may include a "front face" covering the face for inserting the housing-cell assemblies. This front face will be described with reference to FIG. 4. The front face (23) includes the positive terminal (26) and the negative terminal (27) of the module, and generally one or more connector pins (28, 29) for measuring parameters related to the operation of the module.

The module may be arranged in a modular frame, also known as a bay or "rack", of a standard width. In this case, in order to facilitate the assembly or dismantling of the module in the bay, the front face may be provided with one or more means (24) facilitating the gripping of the module, such as one or more rods (25) arranged in one or more hollow portions of the front face and attached to the thickness of the front face. The module may easily be withdrawn from the bay by using a finger or a hook-shaped tool.

The method of fitting a housing-cell assembly in a casing will now be described with reference to FIGS. 5 and 6.

Figure 5:
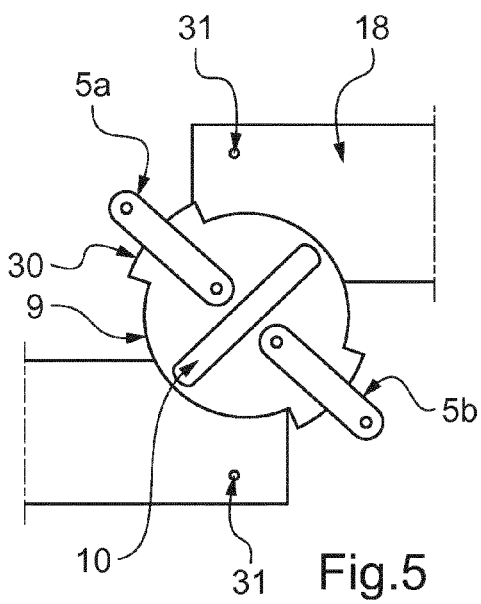
FIG. 5 represents the orientation of the connection bars after insertion of a housing-cell assembly into a cavity of the casing and before locking the housing-cell assembly in the cavity.

FIG. 5 represents the orientation of the connection bars during the insertion of a housing-cell assembly into a cavity of the casing. The housing-cell assembly is seen in a cross-section. Consequently, only the cover (9) of the housing-cell assembly is visible in FIG. 5. The cover is provided with two connection bars (5a, 5b) connected to the positive and negative current terminals of the cell. The face for inserting the housing-cell assembly comprises a support on which electrically conductive tracks (18) are deposited. The housing-cell assembly is inserted into a cavity of the casing. An elastic device, such as a spring may first be inserted into the cavity. The wall of the cavity includes one or more grooves (30), e.g. two in FIG. 5. The presence of these grooves forces the insertion of the housing-cell assembly into a predetermined orientation. In the example in FIG. 5, the connection bars form an angle of +45° with respect to the vertical. In this orientation, the connection bars (5a, 5b) are not in contact with the electrically conductive tracks (18). The insertion of the housing-cell assembly continues until the housing-cell assembly comes into contact with the wall of the casing opposite the face for inserting the cells. To connect the connection bars (5a, 5b) to the electrically conductive tracks (18), the housing-cell assembly is rotated through an angle of −45° thanks to the handle (10) located on the cover (9). The foolproof positioning device located on the tube of the housing-cell assembly stops the rotation of the housing-cell assembly in the cavity. At the end of the rotation, the free end of the connection bars (5a, 5b) is in contact with the electrically conductive tracks (18) of the support. The free end of the connection bars is attached to the electrically conductive track by screwing, for example. For this purpose, the electrically conductive track may comprise threaded drilling points (31). FIG. 6 represents the orientation of the connection bars after placing the connection bars in electrical connection with the electrically conductive tracks of the support. In the position of FIG. 6, the cell is in electrical contact with the neighboring cells.

Figure 6:
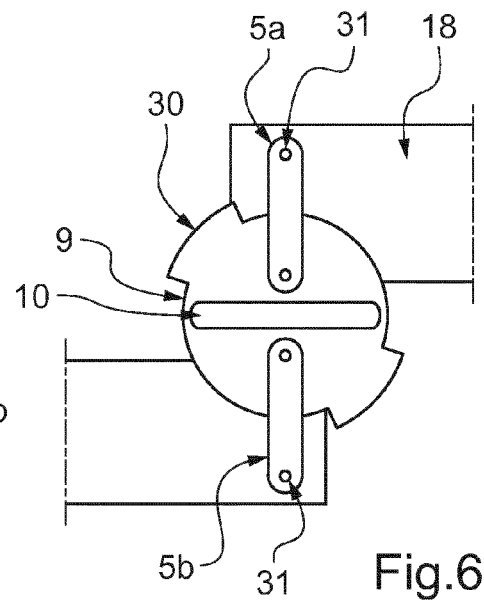
FIG. 6 represents the orientation of the connection bars after rotating a housing-cell assembly in the cavity and electrically connecting the housing-cell assembly with the conductive tracks of the support.

Starting from the position illustrated in FIG. 6, the housing-cell assembly may be extracted, by rotating the housing-cell assembly through an angle of +45°, which has the effect of replacing the connection bars into the position illustrated in FIG. 5. The housing-cell assembly may be withdrawn from its cavity.

The insertion of housing-cell assemblies into one of the cavities of the casing may be repeated until each cavity of the casing receives a housing-cell assembly. When all the cavities of the casing have received a housing-cell assembly, a front face such as that described above may optionally be put in place.

The invention offers the following advantages:

The structure of the housing-cell assembly makes it possible to individually isolate each cell of the module. It simply suffices to unscrew the end of the connection bars connected to an electrically conductive track to electrically insulate the cell. It is therefore no longer necessary to dismantle the whole electrically conductive track ("busbar") to replace a cell. Handling operations of the module are therefore facilitated.

The housing cover and the tube of the housing-cell assembly are generally produced in an electrical insulating material. This helps reduce the risk of exposure of an operator to parts of the cell under polarization. The operator does not manipulate the cell directly by hand, but via the housing cover or the tube. A cell is therefore manually transported under conditions of greater safety.

As it is only possible to replace one cell at a time, the invention helps avoid discarding the whole of the module when only one cell is faulty. The invention thus helps reduce waste.

The prior art modules do not allow the withdrawal of the cells individually. Consequently, an operator wishing to withdraw a module installed in a bay must have sufficient physical capabilities to support the total weight of the module during its withdrawal, i.e. the weight of the casing and the weight of the cells that it contains. The invention makes it possible to withdraw the cells one by one. It helps reduce the physical effort required for withdrawing the module.

Variants of the invention are disclosed below.

Figure 7:
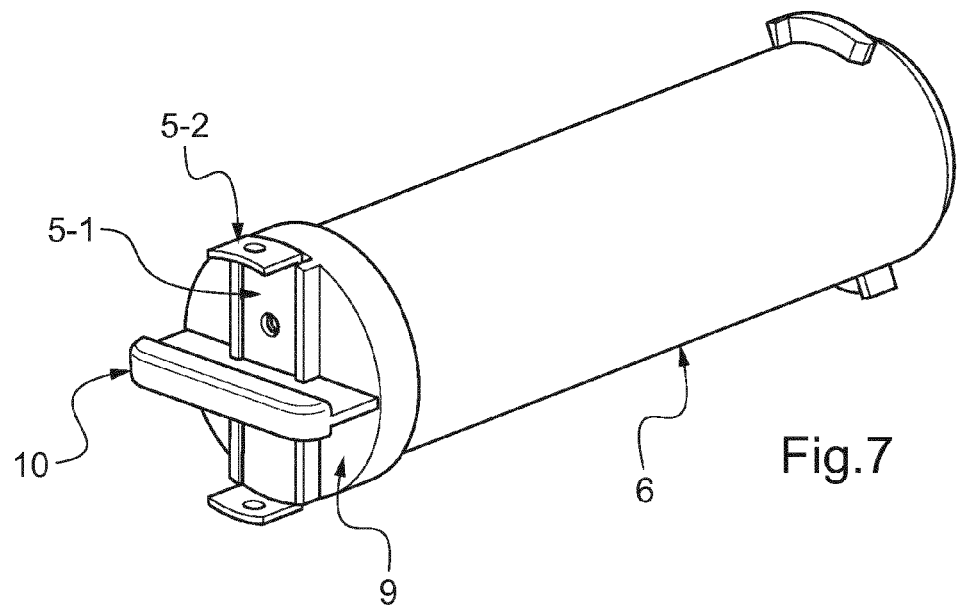
FIG. 7 represents an embodiment wherein the connection bar has a profile forming an angle of about 90°.
Figure 8:
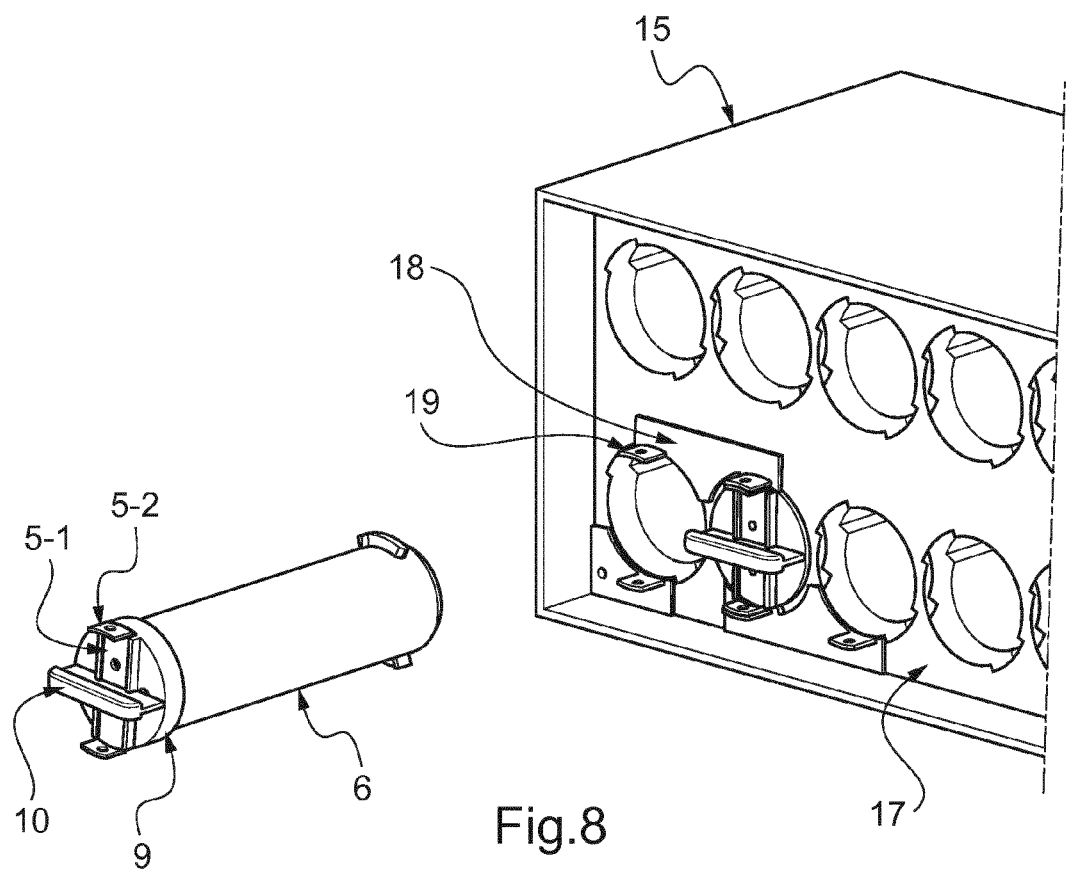
FIG. 8 schematically represents the electrical connection between a connection bar having a profile forming an angle of about 90° and an electrically conductive track.

In a first variant illustrated in FIGS. 7 and 8, the connection bar has a bent profile, e.g. forming an angle of about 90° and not a straight profile. This bend delimits two parts, a first flat part (5-1) intended to be electrically connected to a current output terminal of the cell, a second part (5-2) in the shape of an arc of a circle and which is intended to be held in contact with an electrically conductive track (18). The housing cover (9) is disk-shaped. The surface of this disk includes a handle (10) used for rotating the housing-cell assembly. Two rectilinear guides are used to fix the position of the flat part (5-1) of the connection bar on the housing cover. Each flat part includes an orifice allowing it to be soldered with one of the two current output terminals of the cell. The part (5-2) extending 90° to the flat part (5-1) forms an arc of a circle. Its radius of curvature is substantially equal to the radius of the disk formed by the housing cover.

The part (5-2) extending at 90° is used to make electrical contact with the electrically conductive track. For making this electrical contact, it is necessary for the electrically conductive track (18) to include a part (19) extending 90° with respect to the electrically conductive track support and also be shaped like an arc of a circle. The electrical contact may be obtained by screwing the part of the bar (5-2) in the shape of an arc of a circle with the part of the electrically conductive track (19) also in the shape of an arc of a circle. This embodiment offers the following advantages:

The cells may be closer to each other since there is no need to reserve space on the support (17) for the rotation of a flat profiled bar.

The surface of the support which was dedicated to the rotation of a flat profiled bar may be used for installing thereto electronic components or fastenings for the connection bar. The part (19) extending 90° with respect to the electrically conductive track support generally has a surface less than that dedicated to the rotation of a bar with a flat profile.

Instead of making a contact between the connection bar and the electrically conductive track by screwing, these two parts may be held in place by an elastic device, such as a clamp, the jaws of which keep the part of the connection bar and the part of the electrically conductive track against one another both of them extending 90° with respect to the support (17).

Figure 9:
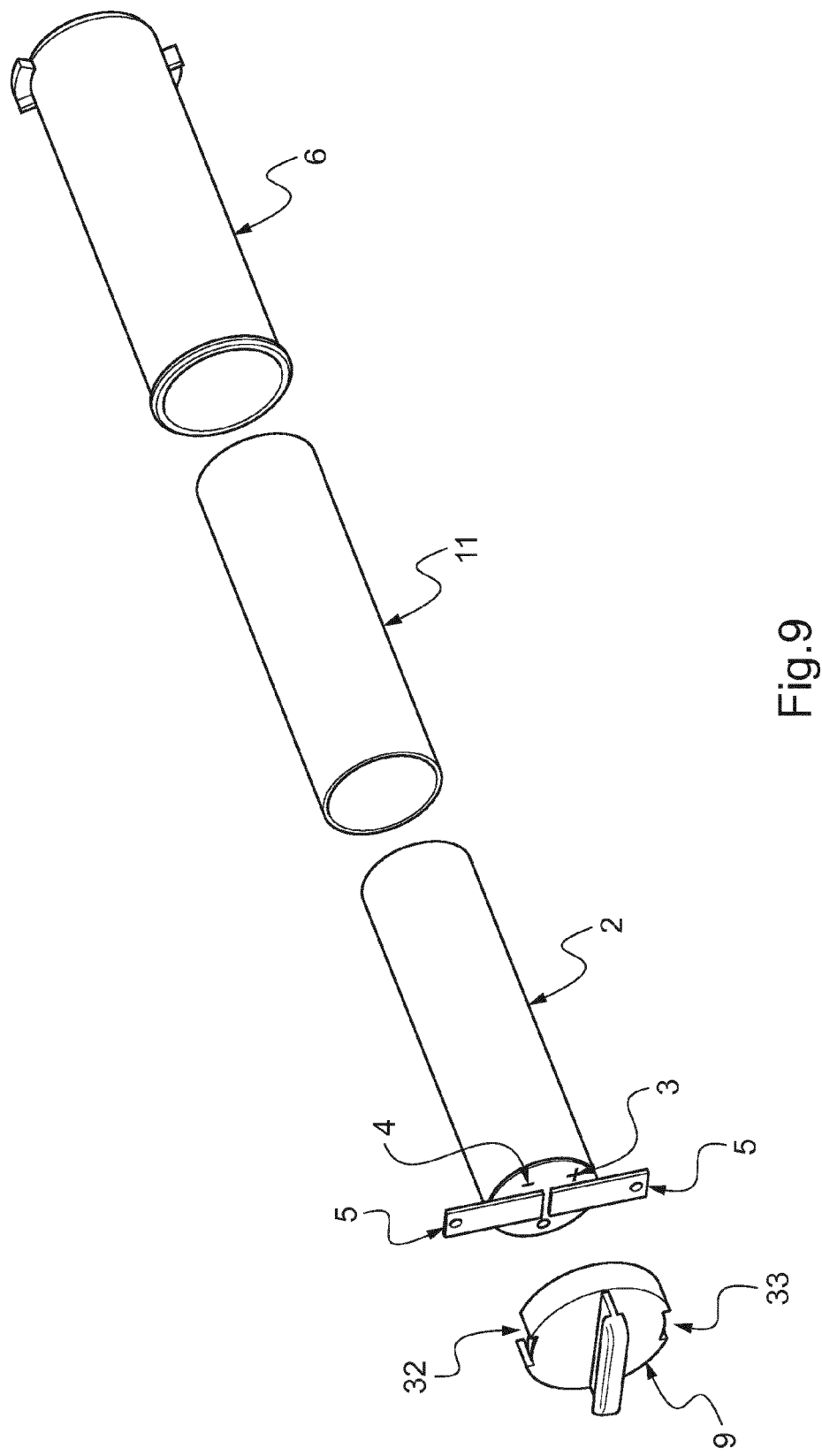
FIG. 9 represents an embodiment wherein the two connection bars have a straight profile and are in direct electrical contact with the output current terminals of the cell.

In a third variant, one of the ends of the connection bars is attached directly to a current output terminal. The housing cover is not inserted between the cell and the connection bars, but covers the end of the bars, attached to the current output terminal. This variant applies both to the case where the bar has a straight profile and where it has a bent profile, e.g. at 90°. FIG. 9 illustrates this variant in the case of a bar with a straight profile. The positive (3) and negative (4) terminals are each electrically connected by soldering or screwing to an electrical connection bar (5) with a straight profile. The housing cover (9) is disk-shaped. Two notches (32, 33) have been made in the thickness of this disk. They allow the passage of the electrical connection bars. This embodiment allows the operator to dispense with step e) of the method of manufacturing the housing-cell assembly described above. Indeed, the bar is attached to the cell during its manufacture.

Figure 10:
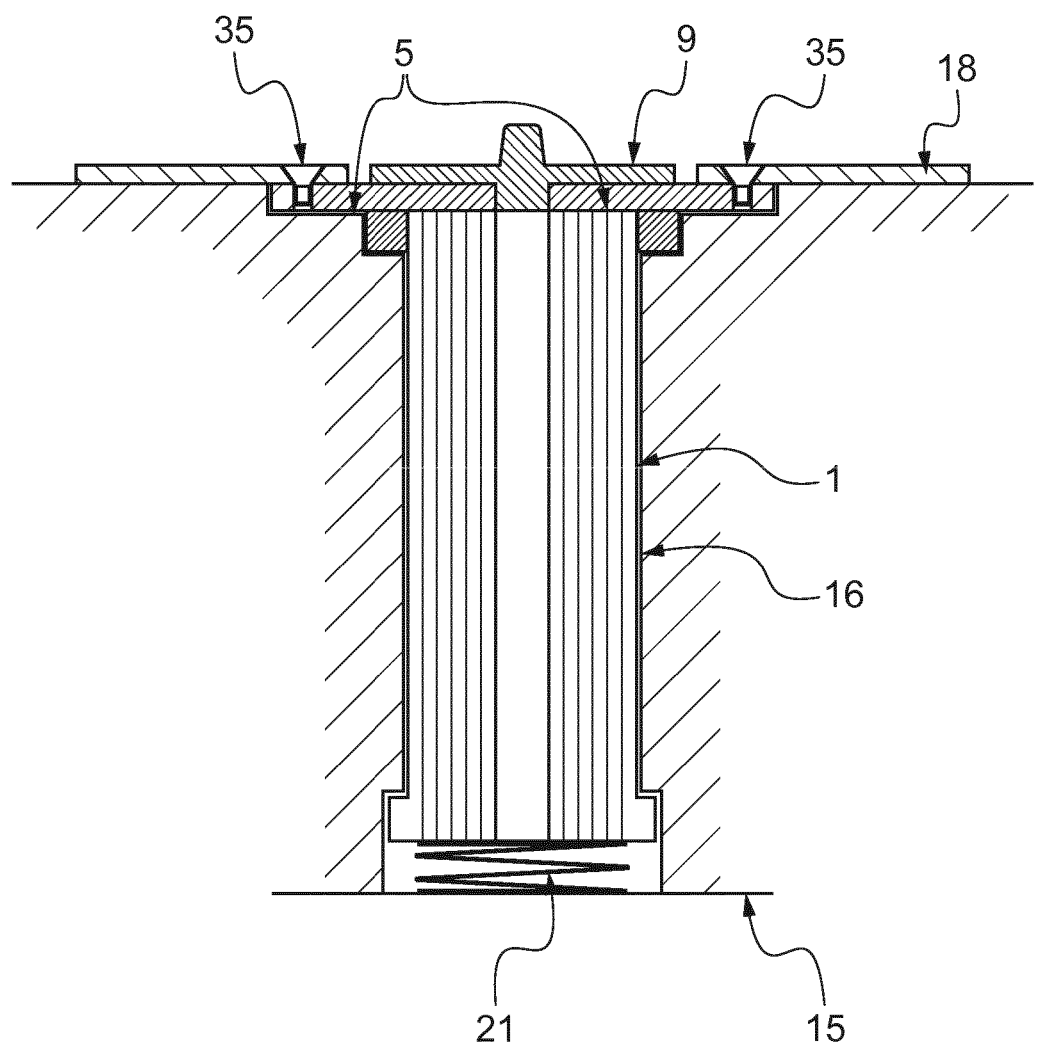
FIG. 10 represents a view in longitudinal section of a housing-cell assembly for the variant wherein an elastic device is placed at the back of a casing cavity.

In a fourth variant described with reference to FIG. 10, an elastic device (21), such as a spring, is inserted at the back of a cavity of the casing, before inserting the housing-cell assembly (1) therein. The elastic device exerts a force directed along the longitudinal axis of the cell, which tends to push the housing-cell assembly outside its cavity (16). The housing-cell assembly is locked by inserting the electrical connection bars (5) under the electrically conductive track (18). As the electrically conductive track is attached to the support, it prevents the ejection of the housing-cell assembly outside its cavity. One or more screws (35) may reinforce the electrical and mechanical contact between the electrical connection bar (5) and the electrically conductive track (18). This variant allows better holding of the housing-cell assembly in the casing.

The invention claimed is:
1. A housing-cell assembly comprising:
a) an electrochemical cell comprising a cylindrical container and two current output terminals arranged on a wall of one of the ends of the container, the two current output terminals being each electrically connected to an electrical connection bar;

b) a housing having the form of a tube wherein the electrochemical cell is housed, the housing electrically insulating the electrochemical cell and having one or more foolproof positioning devices;

c) a housing cover provided with a means for causing the electrochemical cell to rotate about its longitudinal axis, wherein the means to cause the electrochemical cell to rotate causes rotation of the two electrical connection bars and connection of each electrical connection bar to an electrically conductive track, wherein the housing cover comprises two orifices for the passage of the current output terminals.

2. The assembly as claimed in claim 1, wherein a thermal insulation material is arranged around the container of the electrochemical cell.

3. The assembly as claimed in claim 1, wherein the foolproof positioning device consists of one or more lugs.

4. The assembly as claimed in claim 3, wherein the foolproof positioning device consists of two lugs located on the circumference of the housing.

5. The assembly as claimed in claim 1, wherein the foolproof positioning device consists of a flange with one or more hollows.

6. The assembly as claimed in claim 1, wherein one of the ends of the container of the cell is closed by a cover and the electrical connection bars are attached directly onto the cover of the cell.

7. The assembly as claimed in claim 1, wherein each electrical connection bar is flat.

8. The assembly as claimed in claim 1, wherein the profile of each electrical connection bar is bent, the bend delimiting two parts, a first part flat and electrically connected to a current output terminal, a second part forming an arc of a circle.

9. The assembly of claim 8, wherein each electrical connection bar is bent forming an angle of about 90°.

10. The assembly as claimed in claim 1, wherein the container has one end closed by a wall having a thinning suitable for bursting under overpressure inside the container.

11. The assembly as claimed in claim 1, wherein the electrochemical cell is of the lithium-ion type.

12. A battery module including a casing including a plurality of cavities each receiving a housing-cell assembly as claimed in claim 1.

13. The module as claimed in claim 12, wherein each cavity has a wall comprising one or more grooves into which a foolproof positioning device of the housing is inserted.

14. The module as claimed in claim 12, wherein the casing has a face for inserting the housing-cell assemblies, said insertion face including a support on which electrically conductive tracks are arranged, each electrical connection bar being in contact with an electrically conductive track.

15. The module as claimed in claim 14, wherein the profile of each electrical connection bar forms an angle of about 90° thus delimiting two parts, a first part being flat and electrically connected to a current output terminal of the electrochemical cell, a second part in the shape of an arc of a circle and held in contact with an electrically conductive track.

16. The module as claimed in claim 15, wherein the second part of each electrical connection bar forming an arc of a circle is in contact with a portion of the electrically conductive track, said portion in the shape of an arc of a circle extending in a direction forming an angle of 90° with the support.

17. The module as claimed in claim 16, wherein the contact between the second part of each electrical connection bar forming an arc of a circle and the portion of the electrically conductive track is provided by a mechanical device.

18. The module as claimed in claim 12, further including an elastic device placed between a housing-cell assembly and a wall of the casing, said elastic device holding the electrical connection bar or bars in contact with one or more electrically conductive tracks.

19. The module as claimed in claim 12, wherein the face opposite the face for inserting the housing-cell assemblies includes an openwork wall.

20. The module of claim 19, wherein the openwork wall is a grid.

21. A method of manufacturing a battery module, said method comprising the steps of:
   a) providing a casing including a plurality of cavities, each cavity being intended to receive a housing-cell assembly, said casing having a face for inserting the housing-cell assemblies, said insertion face including a support on which electrically conductive tracks are arranged;
   b) inserting a housing-cell assembly according to claim 1 into a cavity;
   c) rotating the housing-cell assembly about the longitudinal axis of the cell for placing the electrical connection bars in contact with one or more electrically conductive tracks, the foolproof positioning device of the housing serving as a stop to the rotation of the housing-cell assembly;
   d) attaching the electrical connection bars onto the electrically conductive track or tracks;
   e) repeating steps b) to d);
   f) attaching a front face onto the casing, the front face including:
      one or more means facilitating the gripping of the module,
      two positive and negative current output terminals of the battery module,
      one or more connector pins allowing the measurement of parameters related to the operation of the module.

22. A method of manufacturing a battery module, said method comprising the steps of:
   a) providing a casing including a plurality of cavities, each cavity being intended to receive a housing-cell assembly, said casing having a face for inserting the housing-cell assemblies, said insertion face including a support on which electrically conductive tracks are arranged;
   b) inserting a housing-cell assembly according to claim 1 into a cavity;
   c) rotating the housing-cell assembly about the longitudinal axis of the cell for placing the electrical connection bars in contact with one or more electrically conductive tracks, the foolproof positioning device of the housing serving as a stop to the rotation of the housing-cell assembly;
   d) attaching the electrical connection bars onto the electrically conductive track or tracks:
   e) repeating steps b) to d);
   f) attaching a front face onto the casing, the front face including:
      one or more means facilitating the gripping of the module,
      two positive and negative current output terminals of the battery module,
      one or more connector pins allowing the measurement of parameters related to the operation of the module;

wherein the one or more means facilitating the gripping of the module are one or more rods arranged in one or more hollow portions of the front face and attached to the thickness of the front face.

* * * * *